INVENTOR.
JOHN W. WARING
BY
Fordyce A. Bothwell
ATTORNEY

March 13, 1962 J. W. WARING 3,025,343
TELEVISION RECEIVER EMPLOYING IF AMPLIFIER WITH VARIABLE RESPONSE CHARACTERISTIC
Filed Dec. 24, 1958 2 Sheets-Sheet 2
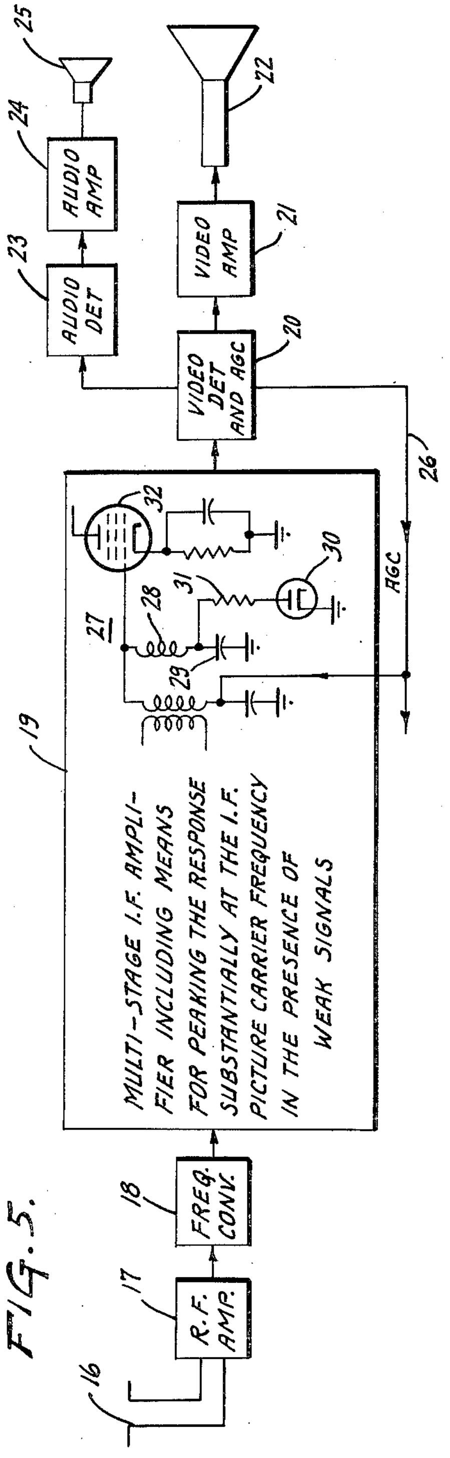
FIG. 7.
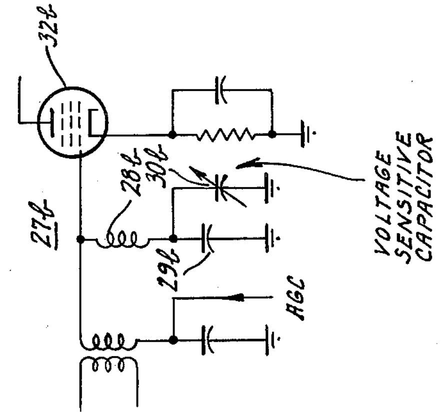
FIG. 6.
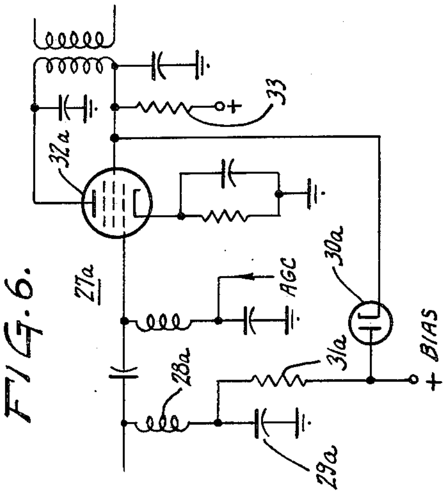
INVENTOR.
JOHN W. WARING
BY Fordyce A. Bothwell
ATTORNEY 3,025,343

TELEVISION RECEIVER EMPLOYING IF AMPLIFIER WITH VARIABLE RESPONSE CHARACTERISTIC

John W. Waring, Palmyra, N.J., assignor, by mesne assignments, to Philco Corporation, Philadelphia, Pa., a corporation of Delaware Filed Dec. 24, 1958, Ser. No. 782,787
11 Claims. (Cl. 178—5.8)

This invention relates to television receivers and more particularly to improvements therein for better reception of weak signals.

In conventional television transmission, the picture and sound signals are transmitted as modulation of the picture and sound carriers which have fixed frequency spacing and are located respectively at or near the opposite ends of the frequency band allotted to the transmission. At the receiver the picture and sound carriers are converted to IF (intermediate) frequencies and are supplied to the IF amplifier which comprises a plurality of stages that are stagger tuned to cover the IF band of the receiver. As is well known, the response of the multi-stage amplifier over the IF band may be caused to have a desired characteristic by suitable arrangement of conventional elements within the successive stages. The normal response is characterized by relatively broad video peaking between the sound and picture carrier frequencies, and the response characteristic has a recess or depression at the sound carrier frequency and zero points at the frequencies for the adjacent picture and sound carriers. The recess and the zero points are produced by shunt resonant circuits known as traps.

While the normal IF response characteristic, with its relatively broad video peaking between the IF sound and picture carrier frequencies, is desirable for normal picture signals, it is not well suited for reception of weak picture signals because the response to such signals is less than the response to noise signals. This objection may be overcome by modifying the IF response characteristic in the presence of weak signals so as to increase the response in the vicinity of the IF picture carrier frequency. Thus as disclosed in U.S. Patent No. 2,646,471, issued July 21, 1953, to O. F. Cheney and assigned to the assignee of the present application, the aforesaid modification of the IF response characteristic may be produced in response to the AGC bias.

In television receivers manufactured and sold by said assignee this AGC-controlled modification of the IF response characteristic has been employed in a manner to effect relatively narrow video peaking in the vicinity of the IF picture carrier frequency. Thus in the presence of weak signals the video peaking is shifted to the vicinity of the IF picture carrier frequency. While this is desirable from the standpoint of discrimination against noise signals, it gave rise to a problem with respect to proper tuning for weak signals as will now be explained.

In normal operation when the signal is strong the user properly tunes the receiver for the best picture, so that the picture carrier is located at the correct point of the passband. In such operation the sound level is relatively independent of the tuning action because of its FM character. However, for weak signals the sound becomes a function of signal amplitude due to less effective limiting, and there is a tendency for the user to tune by sound rather than by picture, or to tune partly by both which is known as "split tuning." One way to avoid split tuning is to offset the video peaking in the direction of the IF sound carrier frequency. Then if the user tunes by sound or partly by both sound and picture, he will tune to peaks for both sound and picture. However, this does not overcome a serious disadvantage of mistuning which resides in the fact that the traps for the adjacent carriers are ineffective at the very time when they are most needed, i.e. when a weak signal is being received. With the receiver mistuned, the adjacent carriers are not located at the aforementioned zero points of the IF response characteristic, and therefore the adjacent carriers are apt to cause interference.

The principal object of the present invention is to ensure proper tuning of a television receiver for weak signals so as to eliminate mistuning and its disadvantages.

More particularly, the principal object of this invention is to provide means in a television receiver for ensuring against mistuning for weak signals rather than seeking to effect a compromise therefor.

In accordance with this invention, provision is made for modifying the IF response characteristic in the vicinity of the IF sound carrier frequency, for weak signals, so as to ensure proper tuning. To this end, the response characteristic is modified so as to shift the aforementioned recess, which is normally located at the IF sound carrier frequency, in a direction opposite from that of the video peaking. The result of this is to increase the response at the IF sound carrier frequency and thus ensure proper tuning. With proper tuning assured, the traps for the adjacent carriers are effective for weak signals when they are most needed.

The desired modification of the IF response characteristic in accordance with this invention is achieved by changing the resonant frequency of a resonant trap circuit which produces the aforementioned recess. Preferably, the frequency change is such as to shift the recess into substantial coincidence with the zero point for the adjacent picture carrier. Preferably also, the Q of the resonant trap circuit is decreased so as to broaden the recess. This gives greater attenuation in the vicinity of the adjacent picture carrier at a time when it is desirable, i.e. when a weak signal is being received.

The invention may be fully understood from the following detailed description with reference to the accompanying drawings wherein:

FIG. 5 is a diagrammatic illustration of a television receiver including an embodiment of the invention;

FIG. 6 is a diagrammatic illustration of another embodiment of the invention; and FIG. 7 is a diagrammatic illustration of still another embodiment.

Figure 1:
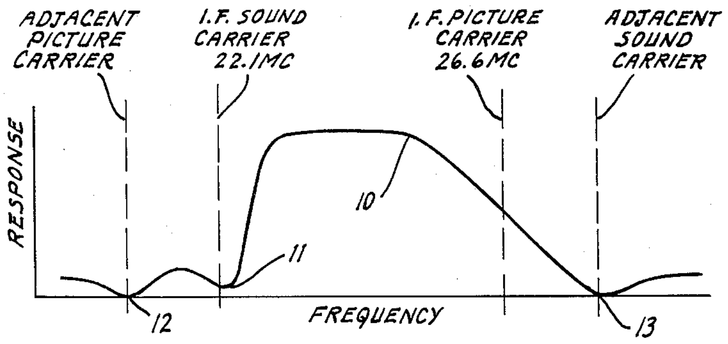
FIGS. 1 to 4 illustrate various conditions of the IF response characteristic to facilitate an understanding of the invention.

Referring first to FIG. 1, there is shown a typical normal response characteristic 10 of the IF amplifier of a television receiver. In this instance, when the receiver is properly tuned, the IF picture carrier is located at approximately the 50% amplitude-response point at the higher frequency portion of the characteristic, and the IF sound carrier is located at the recess 11 which is produced by the sound trap. By way of example, the IF sound and picture carrier frequencies may be 22.1 mc. and 26.6 mc. respectively, as indicated. The zero points produced by the traps for the adjacent picture and sound carrier are located at 12 and 13.

Figure 2:
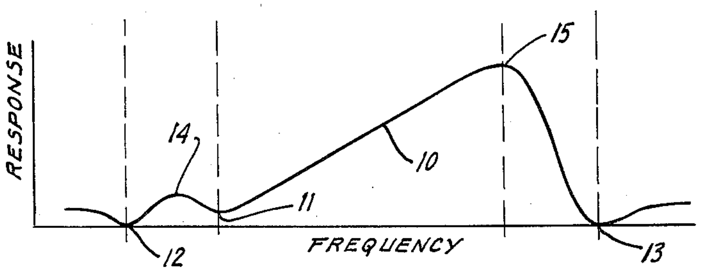

For better reception of weak signals, as hereinbefore described, the IF response characteristic may be modified generally as shown in FIG. 2 in the presence of such signals. With the modification shown in FIG. 2, the video peaking is narrowed and shifted substantially to the IF picture carrier frequency so as to accentuate the lower picture modulation frequencies and to attenuate the higher picture modulation frequencies. As is well understood by those skilled in the art, this results in a better picture for weak signals, particularly in the presence of noise. However, as hereinbefore explained, there is a tendency for the user to mistune the receiver for weak signals so that the IF sound carrier is located at the peak 14, or so that the sound and picture carriers are near the peaks 14 and 15, the latter being known as split tuning.

Figure 3:
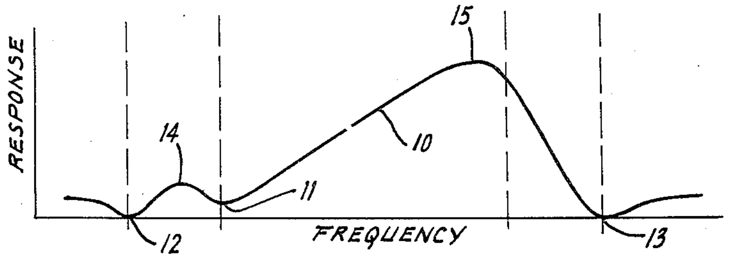

To avoid split tuning, the peak 15 may be offset as shown in FIG. 3, so that the picture carrier will be located thereat when the sound carrier is located at peak 14. However, as hereinbefore pointed out this does not overcome a serious disadvantage of mistuning which resides in the fact that when the receiver is mistuned the adjacent carriers are not located at the zero points 12 and 13.

Figure 4:
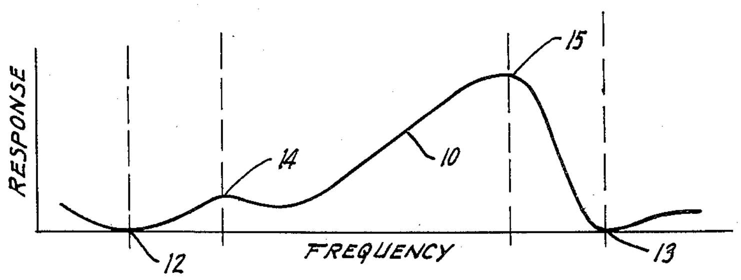

In accordance with the present invention, video peaking according to FIG. 2 preferably is utilized and the lower portion of the response characteristic is modified to the form shown in FIG. 4. The upper part of the modified characteristic is substantially unchanged, the peak 15 preferably being located at the IF picture carrier frequency. However, the lower part of the characteristic is modified by shifting the recess 11 in a direction opposite from that of the video peaking into substantial coincidence with the zero point 12. The result is that the peak 14 is effectively shifted into substantial coincidence with the IF sound carrier frequency. With this form of the response characteristic for weak signals, there are two peaks 14 and 15 located respectively at the IF sound and picture carrier frequencies. Therefore, proper tuning of the receiver is assured and the adjacent carriers are caused to coincide with the zero points 12 and 13. Thus this invention eliminates mistuning and the serious disadvantage thereof.

Further, in the preferred embodiment of the invention the recess 11 is both shifted and broadened in the presence of weak signals. The broadening of the recess gives the added advantage of greater attenuation in the vicinity of the adjacent picture carrier, which is desirable during reception of weak signals.

Referring now to FIG. 5, there is shown a television receiver including one embodiment of the present invention. The receiver illustrated is of the intercarrier-sound type. The usual antenna 16, RF amplifier 17, and frequency converter 18 perform their well-known functions. The multi-stage IF amplifier 19 is of the character presently to be described. The illustrated receiver further comprises the usual video detector and AGC stage 20, video amplifier 21, image reproducer 22, audio detector 23, audio amplifier 24, and sound reproducer 25. The usual AGC connection 26 extends from the stage 20 to the IF amplifier, over which connection a negative bias is supplied to the grids of at least some of the tubes in the multi-stage IF amplifier. As is well understood, the negative bias varies in direct relation to the signal strength. When weak signals are received the negative bias decreases to a low value or to zero so as to utilize substantially the full gain of the IF amplifier.

As indicated, the multi-stage IF amplifier 19 includes means according to the prior art for peaking the response substantially at the IF picture carrier frequency in the presence of weak signals. For normal signals, the amplifier has a response characteristic typified by that shown in FIG. 1. However, for weak signals, the response characteristic is peaked at the IF picture carrier frequency as shown in FIGS. 2 and 4.

In accordance with this invention, in addition to the video peaking substantially at the IF picture carrier frequency for weak signals, the recess 11 is shifted in a direction opposite that of the video peaking, so that the response is increased at the IF sound carrier, frequency, as shown in FIG. 4. This is accomplished by providing, in association with an appropriate stage of the IF amplifier, means for modifying the response characteristic in the vicinity of the IF sound carrier frequency whenever the AGC bias decreases to a low value or to zero in response to a weak signal.

In FIG. 5 the stage which determines the response characteristic in the vicinity of the IF sound carrier frequency is shown at 27. Connected across the input of this stage is a series resonant circuit comprising an inductor 28 and a capacitor 29, which circuit is resonant at the IF sound carrier frequency and produces the recess 11 in the normal response characteristic shown in FIG. 1.

In order to effect the desired modification of the response characteristic, there is provided a diode 30 whose anode is connected to the junction of inductor 28 and capacitor 29 and whose cathode may be connected to ground. The diode serves as a variable impedance in shunt with the capacitor 29 to vary both the resonant frequency and the Q of the resonant circuit. If desired, a resistor 31 may be connected in series with the diode to limit the change in frequency and Q.

During reception of normal signals, the negative AGC bias, which is applied to the control grid of tube 32, is also applied to the diode anode and therefore the diode is substantially non-conductive and its impedance is high. However during reception of weak signals, when the AGC bias goes substantially to zero, the diode becomes conductive and its impedance decreases. The effect of this is to decrease both the resonant frequency and the Q of the resonant circuit, as may be seen from the following.

The frequency of the resonant circuit is given by the equation $$f=\frac{1}{2\pi\sqrt{LC}}\cdot\sqrt{1-\frac{L}{CR_d^2}}$$

where $f$ is the frequency, L is the inductance of inductor 28, C is the capacitance of capacitor 29, and $R_d$ is the diode impedance.

The Q of the resonant circuit is given by the equation $$Q=\frac{\omega L}{R_d}(1+R_d^2\omega^2C^2)$$

Thus it will be seen that, as $R_d$ decreases, both the frequency and the Q decrease. The result, as shown in FIGS. 1 and 4, is to shift the recess 11 to the vicinity of the point of substantially complete attenuation at the adjacent picture carrier frequency, and to broaden the recess so that the response characteristic assumes the form shown in FIG. 4.

If desired, the cathode of diode 30 may have a negative bias applied to it to enhance the operation. Then whenever the AGC bias goes to a value lower than the cathode bias the diode will go into conduction.

Referring now to FIG. 6, there is shown another arrangement according to this invention which is generally similar to that of FIG. 5 but differs therefrom in that the diode 30*a* is indirectly controlled by the AFC bias through control of tube 32*a*. The cathode of the diode is connected to the upper end of the voltage dropping resistor 33 in the screen grid circuit of tube 32*a*, and a positive bias is applied to the anode of the diode, said bias being lower than the positive voltage normally applied to the cathode so that the diode normally is substantially non-conductive. When weak signals are received, the AGC bias causes increased current in tube 32*a* and the voltage on the diode cathode drops below the anode bias, causing the diode to go into conduction.

In FIG. 7 there is shown another embodiment in which a voltage-sensitive capacitor 30*b* (e.g. a capacitor employing barium titanate as the dielectric) is employed instead of a diode and is connected between the junction of inductor 28*b* and capacitor 29*b* and a point of fixed potential such as ground. With this arrangement, the resonant frequency of the resonant circuit is determined by the capacitance of the parallel capacitors 29*b* and 30*b*. When the AGC bias goes substantially to zero in response to a weak signal, the decreased voltage across capacitor 30*b* causes its capacitance to increase, thereby causing decrease of the resonant frequency of the resonant circuit.

While the controlled resonant circuit according to this invention may be employed anywhere in the IF section of the receiver, it is preferably employed in the input of the first IF stage where the signal level is low and the signal will not have any adverse effect upon its operation.

From the foregoing, it will be seen that the present invention has provided a novel arrangement by which proper tuning of a television receiver for weak signals is assured. While certain embodiments have been illustrated, these are exemplary and are not to be regarded as imposing any limitation upon the invention.

I claim:

1. In a television receiver adapted to receive picture and sound carriers having fixed frequency spacing, frequency conversion means for converting said carriers to predetermined IF frequencies for proper tuning of the receiver, a multi-stage IF amplifier having a normal response characteristic including a recess or depression at the predetermined IF sound carrier frequency, said amplifier including means for peaking its response substantially at the predetermined IF picture carrier frequency in the presence of weak signals, an automatic-gain-control system for developing a control bias and applying said bias to at least some of the stages of said amplifier, and means responsive to change of said bias upon reception of weak signals for modifying the response characteristic of said amplifier in the vicinity of said recess so as to shift the latter in a direction opposite from that of the video peaking, whereby to increase the amplifier response at the predetermined IF sound carrier frequency and to ensure proper tuning of the receiver for weak signals.

2. In a television receiver adapted to receive picture and sound carriers having fixed frequency spacing, frequency conversion means for converting said carriers to predetermined IF frequencies for proper tuning of the receiver, a multi-stage IF amplifier having a normal response characteristic including a recess or depression at the predetermined IF sound carrier frequency and a point of substantially complete attenuation at the adjacent picture carrier frequency, said amplifier including means for peaking its response substantially at the predetermined IF picture carrier frequency in the presence of weak signals, an automatic-gain-control system for developing a control bias and applying said bias to at least some of the stages of said amplifier, and means responsive to change of said bias upon reception of weak signals for modifying the response characteristic of said amplifier so as to broaden said recess and shift it in a direction opposite from that of the video peaking to the vicinity of said point of substantially complete attenuation, whereby to increase the amplifier response at the predetermined IF sound carrier frequency and to ensure proper tuning of the receiver for weak signals.

3. In a television receiver adapted to receive picture and sound carriers having fixed frequency spacing, frequency conversion means for converting said carriers to predetermined IF frequencies for proper tuning of the receiver, a multi-stage IF amplifier having a normal response characteristic including a recess or depression at the predetermined IF sound carrier frequency and a point of substantially complete attenuation at the adjacent picture carrier frequency, said amplifier including means for peaking its response substantially at the predetermined IF picture carrier frequency in the presence of weak signals, said amplifier also including a stage having an associated resonant trap circuit for producing said recess, an automatic-gain-control system for developing a control bias and applying said bias to at least some of the stages of said amplifier including the aforementioned stage, and means responsive to change of said bias upon reception of weak signals for changing the resonant frequency of said trap circuit so as to shift said recess in a direction opposite from that of the video peaking to the vicinity of said point of substantially complete attenuation, whereby to increase the amplifier response at the predetermined IF sound carrier frequency and to ensure proper tuning of the receiver for weak signals.

4. A television receiver according to claim 3, wherein the last-recited means comprises a diode connected in shunt with a portion of said resonant trap circuit, and means for rendering the diode substantially non-conductive in the presence of normal signals and for rendering the diode conductive in the presence of weak signals.

5. A television receiver according to claim 4, wherein the resonant trap circuit comprises an inductor and a capacitor connected in series, and said diode is connected in shunt with said capacitor.

6. A television receiver according to claim 3, wherein last-recited means comprises a voltage-sensitive capacitor in shunt with a portion of said resonant trap circuit, and means for changing the voltage applied to said capacitor so as to change its capacitance in the presence of weak signals.

7. A television receiver according to claim 6, wherein the resonant trap circuit comprises an inductor and a capacitor connected in series, and said voltage-sensitive capacitor is connected in shunt with the capacitor of said trap circuit.

8. In a television receiver adapted to receive picture and sound carriers having fixed frequency spacing, frequency conversion means for converting said carriers to predetermined IF frequencies for proper tuning of the receiver, a multi-stage IF amplifier having a normal response characteristic including a recess or depression at the predetermined IF sound carrier frequency and a point of substantially complete attenuation at the adjacent picture carrier frequency, said amplifier including means for peaking its response substantially at the predetermined IF picture carrier frequency in the presence of weak signals, said amplifier also including a stage having an associated resonant trap circuit for producing said recess, an automatic-gain-control system for developing a control bias and applying said bias to at least some of the stages of said amplifier including the aforementioned stage, and means responsive to change of said bias upon reception of weak signals for changing the Q and the resonant frequency of said trap circuit so as to broaden said recess and shift it in a direction opposite from that of the video peaking to the vicinity of said point of substantially complete attenuation, whereby to increase the amplifier response at the predetermined IF sound carrier frequency and to ensure proper tuning of the receiver for weak signals.

9. A television receiver according to claim 8, wherein the last-recited means comprises a diode connected in shunt with a portion of said resonant trap circuit, and means for rendering the diode substantially non-conductive in the presence of normal signals and for rendering the diode conductive in the presence of weak signals.

10. In a television receiver adapted to receive picture and sound carriers having fixed prequency spacing, frequency conversion means for converting said carriers to predetermined IF frequencies for proper tuning of the receiver, a multi-stage IF amplifier having a normal response characteristic including a recess or depression at the predetermined IF sound carrier frequency, an automatic-gain-control system for developing a control bias and applying said bias to at least some of the stages of said amplifier, and means responsive to change of said bias upon reception of weak signals for modifying the response characteristic of said amplifier so as to shift said recess and increase the amplifier response at the predetermined IF sound carrier frequency, thereby to ensure proper tuning of the receiver for weak signals.

11. In a television receiver adapted to receive picture and sound carriers having fixed frequency spacing, frequency conversion means for converting said carriers to predetermined IF frequencies for proper tuning of the receiver, a multi-stage IF amplifier having a normal response characteristic including a recess or depression at the predetermined IF sound carrier frequency and a point of substantially complete attenuation at the adjacent picture carrier frequency, an automatic-gain-control system for developing a control bias and applying said bias to at least some of the stages of said amplifier, and means responsive to change of said bias upon reception of weak signals for modifying the response characteristic of said amplifier so as to broaden said recess and shift it to the vicinity of said point of substantially complete attenuation, whereby to increase the amplifier response at the predetermined IF sound carrier frequency and to ensure proper tuning of the receiver for weak signals.

References Cited in the file of this patent

UNITED STATES PATENTS

| | | |
|---|---|---|
| 2,164,745 | Kentner | July 4, 1939 |
| 2,646,471 | Cheney | July 21, 1953 |
| 2,845,483 | Massman | July 29, 1958 |
| 2,880,269 | Dome | Mar. 31, 1959 |
| 2,901,537 | Comninos | Aug. 25, 1959 |
| 2,904,627 | Cotsworth | Sept. 15, 1959 |

FOREIGN PATENTS

| | | |
|---|---|---|
| 905,377 | Germany | Mar. 1, 1954 |